US010290911B2

United States Patent
Zhou et al.

(10) Patent No.: US 10,290,911 B2
(45) Date of Patent: *May 14, 2019

(54) COOLING LOOPS AND VEHICLES INCORPORATING THE SAME

(71) Applicant: Toyota Motor Engineering & Manufacturing North America, Inc., Erlanger, KY (US)

(72) Inventors: Feng Zhou, Ann Arbor, MI (US); Ercan Mehmet Dede, Ann Arbor, MI (US); Shailesh Joshi, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 876 days.

This patent is subject to a terminal disclaimer.

(21) Appl. No.: 14/714,652

(22) Filed: May 18, 2015

(65) Prior Publication Data

US 2016/0344074 A1    Nov. 24, 2016

(51) Int. Cl.
*B60H 1/00* (2006.01)
*H01M 10/6568* (2014.01)
*H01M 10/625* (2014.01)
*B60L 11/18* (2006.01)
*H01M 10/6569* (2014.01)
*H01M 10/667* (2014.01)
*H01M 10/613* (2014.01)

(52) U.S. Cl.
CPC .......... *H01M 10/6568* (2015.04); *B60H 1/00* (2013.01); *B60L 11/1874* (2013.01); *H01M 10/613* (2015.04); *H01M 10/625* (2015.04); *H01M 10/6569* (2015.04); *H01M 10/667* (2015.04); *H01M 2220/20* (2013.01)

(58) Field of Classification Search
CPC .......... H01M 10/6568; H01M 10/613; H01M 10/667; H01M 10/6569; H01M 2220/20; B60H 1/00; B60L 11/1874
USPC .......................................................... 165/41
See application file for complete search history.

(56) References Cited

U.S. PATENT DOCUMENTS

| 7,056,251 B2 | 6/2006 | Ibaraki |
| 7,253,353 B2 * | 8/2007 | Stabler ..................... B60K 6/26 136/205 |
| 8,552,283 B2 | 10/2013 | Dede et al. |

(Continued)

FOREIGN PATENT DOCUMENTS

KR    2005046186    5/2005

OTHER PUBLICATIONS

Martins, et al., "Thermoelectric exhaust energy recovery with temperature control through heat pipes"; https://repositorium.sdum.uminho.pt/bitstream/1822/15737/1/2011-01-0315_final.pdf.

*Primary Examiner* — Claire Rojohn, III
(74) *Attorney, Agent, or Firm* — Dinsmore & Shohl LLP (57) ABSTRACT

Cooling loops and vehicles including cooling loops include a power module, a cooling loop including a cooler thermally coupled to the power module, a working fluid housed within the cooler, where the working fluid absorbs thermal energy from the power module, a heat exchanger in fluid communication with the cooler, a pump in fluid communication with the heat exchanger and the cooler, and a vehicle component thermally coupled to the cooling loop, where the working fluid from the cooler is selectively directed to the vehicle component.

9 Claims, 8 Drawing Sheets

(56) References Cited

U.S. PATENT DOCUMENTS

| | | | |
|---|---|---|---|
| 8,628,025 B2* | 1/2014 | Bucknell | F01N 5/02 123/41.21 |
| 9,799,935 B2* | 10/2017 | Zhou | H01M 14/00 |
| 9,844,995 B2* | 12/2017 | Rawlinson | B60H 1/00278 |
| 9,878,703 B2* | 1/2018 | Kava | B60L 7/16 |
| 9,895,981 B2* | 2/2018 | Cimatti | B60L 11/18 |
| 2004/0069546 A1* | 4/2004 | Lou | B60K 6/22 180/65.21 |
| 2004/0194949 A1* | 10/2004 | Ban | B60H 1/00314 165/287 |
| 2005/0056035 A1* | 3/2005 | Smith | B60H 1/00207 62/244 |
| 2005/0133215 A1* | 6/2005 | Ziehr | B60H 1/00392 165/202 |
| 2006/0000429 A1* | 1/2006 | Stone | B60K 11/04 123/41.49 |
| 2006/0060340 A1* | 3/2006 | Busse | B60H 1/00278 165/202 |
| 2006/0169507 A1* | 8/2006 | Inoue | B60K 11/02 180/68.4 |
| 2009/0024256 A1* | 1/2009 | Adams | B60H 1/00278 700/300 |
| 2009/0078400 A1* | 3/2009 | Tamura | B60H 1/00278 165/287 |
| 2009/0280395 A1* | 11/2009 | Nemesh | B60H 1/00278 429/62 |
| 2010/0291414 A1* | 11/2010 | Bell | H01M 2/1077 429/7 |
| 2011/0027625 A1* | 2/2011 | Payne | H01M 6/50 429/50 |
| 2011/0052959 A1* | 3/2011 | Koetting | H01M 10/653 429/120 |
| 2011/0072841 A1* | 3/2011 | Arai | B60H 1/00278 62/259.2 |
| 2011/0239659 A1* | 10/2011 | Lior | B60H 1/004 60/783 |
| 2011/0296855 A1* | 12/2011 | Johnston | B60L 3/0046 62/79 |
| 2012/0003516 A1* | 1/2012 | Eisenhour | H01M 10/625 429/62 |
| 2012/0028087 A1* | 2/2012 | Gaben | B60L 11/1872 429/50 |
| 2012/0102995 A1* | 5/2012 | Sakata | B60L 1/003 62/238.1 |
| 2012/0152487 A1 | 6/2012 | Styles et al. | |
| 2012/0186775 A1* | 7/2012 | Fraser | B60K 6/46 165/41 |
| 2012/0241129 A1* | 9/2012 | Kohl | B60H 1/00278 165/58 |
| 2012/0244394 A1* | 9/2012 | Hohenthanner | H01M 2/0245 429/50 |
| 2012/0247715 A1* | 10/2012 | Renner | B60H 1/00385 165/42 |
| 2012/0316712 A1* | 12/2012 | Simonini | B60K 6/46 701/22 |
| 2013/0111932 A1* | 5/2013 | Mishima | F25B 29/00 62/79 |
| 2013/0166119 A1* | 6/2013 | Kummer | H01M 10/443 701/22 |
| 2013/0192272 A1* | 8/2013 | Ranalli | F25B 21/04 62/3.3 |
| 2013/0280561 A1* | 10/2013 | Tolkacz | B60W 10/26 429/50 |
| 2013/0280564 A1* | 10/2013 | Zheng | H01M 10/613 429/62 |
| 2013/0298583 A1* | 11/2013 | O'Donnell | H01M 6/5038 62/115 |
| 2013/0298588 A1* | 11/2013 | Jojima | B60H 1/32 62/259.2 |
| 2013/0322488 A1* | 12/2013 | Yazami | G01N 27/27 374/142 |
| 2014/0034102 A1 | 2/2014 | Ranalli et al. | |
| 2014/0034288 A1* | 2/2014 | Buford | B60K 11/00 165/287 |
| 2014/0041826 A1* | 2/2014 | Takeuchi | B60L 1/02 165/10 |
| 2014/0070013 A1* | 3/2014 | Stanek | B60H 1/00 237/28 |
| 2014/0103128 A1* | 4/2014 | Patel | B60H 1/00885 237/5 |
| 2014/0144160 A1* | 5/2014 | Jackson | H01M 10/625 62/62 |
| 2014/0148965 A1* | 5/2014 | Epstein | B60L 11/1842 700/297 |
| 2014/0202178 A1* | 7/2014 | Trumbower | B60L 11/1874 62/62 |
| 2014/0216709 A1* | 8/2014 | Smith | B60H 1/00642 165/287 |
| 2014/0266038 A1* | 9/2014 | Gibeau | B60L 11/1875 320/109 |
| 2014/0311180 A1* | 10/2014 | Kawakami | B60H 1/00278 62/498 |
| 2014/0326430 A1* | 11/2014 | Carpenter | B60L 11/1874 165/41 |
| 2014/0338376 A1* | 11/2014 | Carpenter | B60L 1/003 62/115 |
| 2014/0374060 A1* | 12/2014 | Labaste Mauhe | B60H 1/00278 165/62 |
| 2015/0000327 A1* | 1/2015 | Kakehashi | F25D 17/02 62/434 |
| 2015/0010785 A1* | 1/2015 | Ogawa | H01M 8/0618 429/9 |
| 2015/0013363 A1* | 1/2015 | Arai | F25B 41/04 62/175 |
| 2015/0096716 A1* | 4/2015 | Powell | F01P 3/18 165/41 |
| 2015/0101789 A1* | 4/2015 | Enomoto | B60H 1/00485 165/202 |
| 2015/0258875 A1* | 9/2015 | Enomoto | B60L 1/003 165/104.31 |
| 2015/0288041 A1* | 10/2015 | Forte | H01M 8/04201 429/9 |
| 2015/0306974 A1* | 10/2015 | Mardall | B60L 11/1874 320/150 |
| 2016/0023532 A1* | 1/2016 | Gauthier | B60L 1/06 62/243 |
| 2016/0141569 A1* | 5/2016 | Mascianica | H01M 10/647 429/99 |
| 2016/0285144 A1* | 9/2016 | Song | H01M 10/63 |
| 2016/0318370 A1* | 11/2016 | Rawlinson | B60H 1/00278 |
| 2016/0318409 A1* | 11/2016 | Rawlinson | B60L 1/003 |
| 2016/0318410 A1* | 11/2016 | Rawlinson | B60L 11/1875 |
| 2016/0325598 A1* | 11/2016 | Schumann | B60H 1/00278 |
| 2016/0359208 A1* | 12/2016 | Lear | H01M 10/625 |
| 2017/0001493 A1* | 1/2017 | Graaf | B60H 1/00057 |
| 2017/0008367 A1* | 1/2017 | Cho | B60H 1/00278 |
| 2017/0088006 A1* | 3/2017 | Blatchley | B60H 1/00278 |
| 2017/0088007 A1* | 3/2017 | Melendez | B60L 11/1874 |
| 2017/0096073 A1* | 4/2017 | Mardall | B60L 11/1874 |
| 2018/0156143 A1* | 6/2018 | Hussain | F02D 41/26 |

\* cited by examiner

COOLING LOOPS AND VEHICLES INCORPORATING THE SAME

TECHNICAL FIELD

The present specification generally relates to cooling loops and vehicles that include cooling loops, and more specifically, apparatuses and systems for harvesting waste heat from cooling loops.

BACKGROUND

Vehicles include various components that generate heat that must be dissipated to maintain the performance of the components. In one example, vehicles, and in particular hybrid-electric vehicles and electric vehicles include power electronics that generate a significant amount of heat. To dissipate the heat generated by the power electronics, cooling systems and cooling loops including a working fluid absorb thermal energy from the power electronics and transfer this thermal energy to ambient air surrounding the cooling loop.

The thermal energy that is transferred to the ambient air is referred to as "waste heat" and represents lost energy that is not utilized by the vehicle or vehicle systems. As consumer demands for vehicle efficiency and fuel/energy economy increase, minimization of lost energy is desirable.

Accordingly, a need exists for alternative apparatuses and systems for harvesting waste heat from cooling loops.

SUMMARY

In one embodiment, a vehicle includes a power module, a cooling loop including a cooler thermally coupled to the power module, a working fluid housed within the cooler, where the working fluid absorbs thermal energy from the power module, a heat exchanger in fluid communication with the cooler, a pump in fluid communication with the heat exchanger and the cooler, and a vehicle component thermally coupled to the cooling loop, where the working fluid from the cooler is selectively directed to the vehicle component.

In another embodiment, a cooling system for a vehicle includes a power module, a cooling loop including a cooler thermally coupled to the power module, a working fluid housed within the cooler, where the working fluid absorbs thermal energy from the power module, a heat exchanger in fluid communication with the cooler, a pump in fluid communication with the heat exchanger and the cooler, at least one control valve in fluid communication with the cooler, a heating system including a heater core in fluid communication with the cooler, where heating of a cabin of the vehicle is facilitated by the heater core, a battery pack assembly in fluid communication with the cooler, a temperature sensor thermally coupled to the battery pack assembly, and an electronic controller communicatively coupled to the at least one control valve, the temperature sensor, and the heating system, the electronic controller including a processor and a memory storing a computer readable and executable instruction set, where, when the computer readable and executable instruction set is executed by the processor, the electronic controller detects a temperature of the battery pack assembly with the temperature sensor, detects a disengagement of the heating system, and commands the at least one control valve to direct the working fluid from the cooler to at least one of the heater core and the battery pack assembly based on at least one of the detected temperature of the battery pack assembly and the disengagement of the heating system.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include cooling loops that absorb and dissipate heat generated by a power module of the vehicle. The cooling loops include a cooler that houses a working fluid, a heat exchanger in fluid communication with the cooler, a pump in fluid communication with cooler and the heat exchanger, and a thermoelectric generator thermally coupled to the cooling loop. In some embodiments, the working fluid may be selectively directed to heat a battery pack assembly of the vehicle or a heater core of the vehicle. Through the thermoelectric generator and by selectively directing the working fluid to heat the battery pack assembly and/or the heater core of the vehicle, thermal energy generated by the power module may be harvested and utilized instead of being lost to the environment. These and other embodiments will be described in more detail below in reference to the appended drawings.

The phrase "communicatively coupled" is used herein to describe the interconnectivity of various components of the cooling system and means that the components are connected either through wires, optical fibers, or wirelessly such that electrical, optical, and/or electromagnetic signals may be exchanged between the components. The phrase "electrically coupled" is used herein to describe the interconnectivity of various components of the cooling system and means that the components are connected through wires or the like, such that electrical current may be exchanged between the components. The phrase "thermally coupled" is used herein to describe the interconnectivity of various components of the cooling system and means that the components are coupled to one another such that thermal energy may be exchanged between the components. Components that are thermally coupled may be directly coupled or may be coupled via an intermediate, thermally conductive substrate layer (for example and without limitation, thermal paste, epoxy, direct bonded copper (DBC), direct bonded aluminum (DBA), or similar materials) and may be coupled by bonding techniques such as soldering, transient liquid phase bonding (TLP), or nano-silver sintering, for example. Alternatively, components that are thermally coupled may be detached from one another, but placed proximate to one another such that thermal energy may be exchanged between the components.

Figure 1:
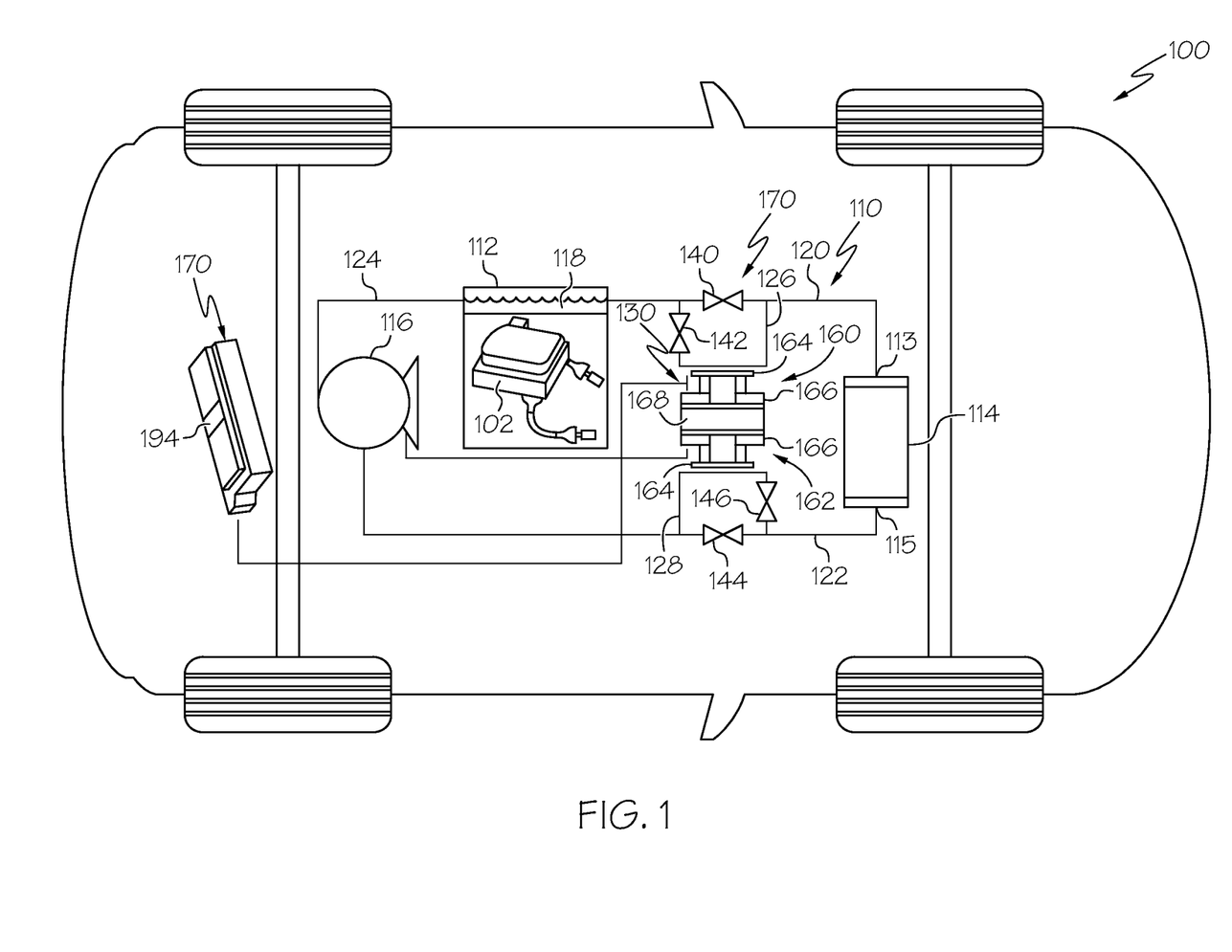
FIG. 1 schematically depicts a cooling system of a vehicle including a thermoelectric generator according to one or more embodiments shown or described herein.

Referring initially to FIG. 1, a vehicle 100 is depicted. The vehicle 100 includes a power module 102 that produces heat that may need to be dissipated to maintain performance of the power module 102. In embodiments, the power module 102 may be included in inverter/converter circuits in electrified vehicles, such as hybrid electric vehicles, plug-in hybrid electric vehicles, electric vehicles, and the like. The power module 102 may include electronic devices, such as electronics devices such as semiconductor devices, insulated gate bipolar transistors (IGBT), metal-oxide-semiconductor field effect transistors (MOSFET), power diodes, power bipolar transistors, and power thyristor devices, or the like. Alternatively, the power module 102 may include any vehicle component that produces heat while operating that may need to be dissipated to maintain performance (e.g., mechanical devices such as motors, engines, etc.). Excess heat may cause premature failure of the power module 102 or may cause the power module 102 to operate inefficiently.

The power module 102 is thermally coupled to a cooling loop 110 that dissipates heat produced by the power module 102. The cooling loop 110 includes a cooler 112, a heat exchanger 114, and a pump 116 that are in fluid communication with one another. The power module 102 is thermally coupled to the cooler 112.

The cooler 112 houses a working fluid 118 which absorbs heat produced by the power module 102. The working fluid 118 may be any appropriate liquid, such as deionized water or radiator fluid. Other exemplary fluids include, for example and without limitation, water, organic solvents, and inorganic solvents. Examples of such solvents may include commercial refrigerants such as R-134a, R717, and R744. Selection of the composition of the working fluid 118 used in association with the power module 102 may be selected based on, among other properties, the boiling point, the density, and/or the viscosity of the fluid.

In embodiments, the working fluid 118 in the cooler 112 undergoes a phase change when exposed to heat produced by the power module 102. In particular, the working fluid 118 in the cooler 112 may initially be in a liquid state. As the cooler 112 is thermally coupled to the power module 102, the power module 102 heats the cooler 112 and the working fluid 118 housed within the cooler 112. Upon exposure to heat produced by the power module 102, the working fluid 118 may undergo a phase change, changing from a liquid to a vapor or vapor/liquid mixture. By changing phase from a liquid to a vapor or vapor/liquid mixture, the working fluid 118 may absorb a greater amount of thermal energy from the power module 102 as compared to a working fluid that does not undergo a phase change.

The cooler 112 is in fluid communication with the heat exchanger 114. In particular, the vapor and/or vapor/liquid mixture of the working fluid 118 flows from the cooler 112 to an inlet 113 of the heat exchanger 114 through a two-phase side conduit 120 that connects the cooler 112 and the heat exchanger 114. The heat exchanger 114 includes a condenser or radiator including a plurality of fluid passages between the inlet 113 and an outlet 115, and the working fluid 118 from the cooler 112 may pass through the plurality of fluid passages. The heat exchanger 114 may also include a plurality of fins (not depicted) that increase the effective surface area of the heat exchanger 114. The heat exchanger 114 facilitates transfer of thermal energy from the working fluid 118 to ambient air surrounding the heat exchanger 114. By increasing the effective surface area of the heat exchanger, the plurality of fins may increase the efficiency with which the heat exchanger 114 transfers thermal energy from the working fluid 118 to the ambient air. The cooling loop 110 may further include a fan (not depicted) that induces air flow across the heat exchanger 114 to increase the efficiency with which the heat exchanger 114 transfers thermal energy from the working fluid 118 to the ambient air.

As the working fluid 118 passes through the heat exchanger 114 and transfers thermal energy to the ambient air, the working fluid 118 condenses from the vapor and/or vapor/liquid mixture into a liquid. As such, when the working fluid 118 exits the heat exchanger 114 through the outlet 115, the working fluid 118 is in a liquid state.

The heat exchanger 114 is in fluid communication with the pump 116 through a liquid side conduit 122. The working fluid 118 exits the heat exchanger 114 through the outlet 115 in liquid form, passes through the liquid side conduit 122 and moves toward the pump 116. The pump 116 is in fluid communication with the cooler 112 through a pump side conduit 124. The pump 116 applies force to the working fluid 118 to facilitate flow of the working fluid 118 through the cooling loop 110. In particular, the pump 116 applies force to the working fluid 118 from the heat exchanger 114 and pumps the working fluid 118 to the cooler 112 and through the pump side conduit 124. Accordingly, the cooler 112, the heat exchanger 114, and the pump 116 are in fluid communication with each other through the two-phase side conduit 120, the liquid side conduit 122, and the pump side conduit 124.

The cooling loop 110 includes at least one control valve that selectively directs the working fluid 118 through a two-phase bypass loop 126 and/or a liquid bypass loop 128 that are connected to and in fluid communication with the two-phase side conduit 120 and the liquid side conduit 122, respectively. In embodiments, the cooling loop 110 includes a two-phase control valve 140 and a two-phase bypass control valve 142 that selectively open and close to direct the working fluid 118 through the two-phase bypass loop 126 and the two-phase side conduit 120. The two-phase control valve 140 is positioned on the two-phase side conduit 120 and the two-phase bypass control valve 142 is positioned on the two-phase bypass loop 126. To direct the working fluid 118 through the two-phase bypass loop 126, the two-phase control valve 140 may close and the two-phase bypass control valve 142 may open, directing the working fluid 118 from the cooler 112 to flow through the two-phase bypass loop 126. Conversely, the two-phase control valve 140 may open and the two-phase bypass control valve 142 may close to direct the working fluid 118 from the cooler 112 away from the two-phase bypass loop 126 and through the two-phase side conduit 120. Alternatively, the two-phase control valve 140 and the two-phase bypass control valve 142 may both open such that working fluid 118 from the cooler 112 flows both through the two-phase side conduit 120 and the two-phase bypass loop 126 simultaneously. It should be understood that the two-phase bypass control valve 142 alone may selectively direct the working fluid 118 through or away from the two-phase bypass loop 126, for example, in embodiments that do not include the two-phase control valve 140 or when the two-phase control valve 140 remains open.

In embodiments, the cooling loop 110 includes a liquid control valve 144 and a liquid bypass control valve 146 that selectively open and close to direct the working fluid 118 through the liquid bypass loop 128 and the liquid side conduit 122. The liquid control valve 144 is positioned on the liquid side conduit 122 and the liquid bypass control valve 146 is positioned on the liquid bypass loop 128. To direct the working fluid 118 through the liquid bypass loop 128, the liquid control valve 144 may close and the liquid bypass control valve 146 may open, directing the working fluid 118 from the heat exchanger 114 to flow through the liquid bypass loop 128. Conversely, the liquid control valve 144 may open and the liquid bypass control valve 146 may close to direct the working fluid 118 from the heat exchanger 114 away from the liquid bypass loop 128 and through the liquid side conduit 122. Alternatively, the liquid control valve 144 and the liquid bypass control valve 146 may both open such that working fluid 118 from the heat exchanger 114 flows both through the liquid side conduit 122 and the liquid bypass loop 128 simultaneously. It should be understood that the liquid bypass control valve 146 alone may selectively direct the working fluid 118 through or away from the liquid bypass loop 128, for example in embodiments that do not include the liquid control valve 144 or when the liquid control valve 144 remains open.

The vehicle 100 includes a vehicle component 130 thermally coupled to the cooling loop 110. In the embodiment shown in FIG. 1, the vehicle 100 includes a thermoelectric generator thermally coupled to the cooling loop 110. In other embodiments, the vehicle component 130 may include a battery pack 170 (FIG. 2) thermally coupled to the cooling loop 110, and/or a heater core 180 (FIG. 3) thermally coupled to the cooling loop 110. Referring back to FIG. 1, in embodiments, a first thermoelectric generator 160 is thermally coupled to the two-phase bypass loop 126 and/or a second thermoelectric generator 162 is thermally coupled to the liquid bypass loop 128. Alternatively, the first thermoelectric generator 160 may be thermally coupled to the two-phase side conduit 120 and the second thermoelectric generator 162 may be coupled to the liquid side conduit 122 of the cooling loop 110, for example, in embodiments of the cooling loop 110 that do not include a two-phase bypass loop 126 and/or a liquid bypass loop 128. While the first thermoelectric generator 160 and the second thermoelectric generator 162 are described and depicted as being thermally coupled to the cooling loop 110, it should be understood that the vehicle 100 may include a single thermoelectric generator or any number of thermoelectric generators thermally coupled to the cooling loop 110.

The first thermoelectric generator 160 and/or the second thermoelectric generator 162 include a thermoelectric device that produces electrical power when a first portion 164 and a second portion 166 of the first thermoelectric generator 160 and the second thermoelectric generator 162 have a temperature differential. In embodiments, the first thermoelectric generator 160 and/or the second thermoelectric generator 162 may be formed from Bismuth Antimony Telluride (BiSbTe). Alternatively, similar thermoelectric device materials may be used. While the first thermoelectric generator 160 and the second thermoelectric generator 162 are described and depicted as discrete structures, it should be understood that the first thermoelectric generator 160 and the second thermoelectric generator 162 may include any suitable configuration, for example and without limitation, a thermoelectric tape wrapped around the two-phase bypass loop 126 and the liquid bypass loop 128, respectively.

The first portion 164 of the first thermoelectric generator 160 is thermally coupled to the cooling loop 110. In embodiments, the first portion 164 of the first thermoelectric generator 160 is thermally coupled to the two-phase bypass loop 126. As described hereinabove, the working fluid 118 from the cooler 112, and accordingly the working fluid 118 in the two-phase bypass loop 126 has absorbed thermal energy from the power module 102 and has a relatively high temperature as compared to ambient air surrounding the vehicle 100.

The second portion 166 of the first thermoelectric generator 160 is exposed to a medium that is at a second temperature which is less than the temperature of the cooling loop 110. In embodiments, the second portion 166 of the first thermoelectric generator 160 may be thermally coupled to a substrate 168 that is exposed to ambient air. Alternatively, the second portion 166 of the first thermoelectric generator 160 may be directly exposed to ambient air. Accordingly, the second portion 166 of the first thermoelectric generator 160 is exposed to a relatively low temperature as compared to the first portion 164 of the first thermoelectric generator 160 such that a temperature differential is formed across the first thermoelectric generator 160 between the first portion 164 and the second portion 166. The temperature differential in the first thermoelectric generator 160 causes the first thermoelectric generator 160 to produce a voltage potential due to the Seebeck effect, as commonly understood in the art. When this voltage potential is attached to a load, electrical power is produced as a result of the temperature differential across the first thermoelectric generator 160.

As described hereinabove, the two-phase control valve 140 and/or the two-phase bypass control valve 142 selectively direct or prohibit flow of the working fluid 118 through the two-phase bypass loop 126. As the first portion 164 of the first thermoelectric generator 160 is thermally coupled to the two-phase bypass loop 126, by selectively directing or prohibiting flow of the working fluid 118 through the two-phase bypass loop 126, the two-phase control valve 140 and/or the two-phase bypass control valve 142 selectively control the amount of thermal energy exposed to the first portion 164 of the first thermoelectric generator 160. By selectively controlling the amount of thermal energy exposed to the first portion 164 of the first thermoelectric generator 160, the two-phase control valve 140 and/or the two-phase bypass control valve 142 selectively control the temperature differential between the first portion 164 and the second portion 166 of the first thermoelectric generator 160. Accordingly, the two-phase control valve 140 and/or the two-phase bypass control valve 142 selectively control the amount of electrical energy produced by the first thermoelectric generator 160.

In the embodiment depicted in FIG. 1, the second thermoelectric generator 162 is thermally coupled to the cooling loop 110. The first portion 164 of the second thermoelectric generator 162 is thermally coupled to the cooling loop 110, and in particular, is thermally coupled to the liquid bypass loop 128. As described hereinabove, the working fluid 118 exiting the heat exchanger 114 is a condensed liquid and has transferred thermal energy to the ambient air in the heat exchanger 114. However, the working fluid 118 exiting the heat exchanger 114 may still have a relatively high temperature as compared to ambient air. As such, the working fluid 118 in the liquid bypass loop 128 has a relatively high temperature as compared to the ambient air.

The second portion 166 of the second thermoelectric generator 162 is exposed to a medium that is at a second temperature which is less than the temperature of the cooling loop 110. In embodiments, the second portion 166 of the second thermoelectric generator 162 may be coupled to the substrate 168 that is exposed to ambient air. Alternatively, the second portion 166 of the second thermoelectric generator 162 may be directly exposed to the ambient air. Accordingly, the second portion 166 of the second thermoelectric generator 162 is exposed to a relatively low temperature as compared to the first portion 164 of the second thermoelectric generator 162 such that a temperature differential is formed across the second thermoelectric generator 162 between the first portion 164 and the second portion 166. The temperature differential in the second thermoelectric generator 162 causes the second thermoelectric generator 162 to produce a voltage potential due to the Seebeck effect, as commonly understood in the art. When this voltage potential is attached to a load, electrical power is produced as a result of the temperature differential across the second thermoelectric generator 162.

As described hereinabove, the liquid control valve 144 and/or the liquid bypass control valve 146 selectively encourage or prohibit flow of the working fluid 118 through the liquid bypass loop 128. As the first portion 164 of the second thermoelectric generator 162 is thermally coupled to the liquid bypass loop 128, by selectively encouraging or prohibiting flow of the working fluid 118 through the liquid bypass loop 128, the liquid control valve 144 and/or the liquid bypass control valve 146 selectively control the amount of thermal energy exposed to the first portion 164 of the second thermoelectric generator 162. By selectively controlling the amount of thermal energy exposed to the first portion 164 of the second thermoelectric generator 162, the liquid control valve 144 and/or the liquid bypass control valve 146 selectively control the temperature differential between the first portion 164 and the second portion 166 of the second thermoelectric generator 162. Accordingly, the liquid control valve 144 and/or the liquid bypass control valve 146 selectively control the amount of electrical energy produced by the second thermoelectric generator 162.

The first thermoelectric generator 160 and/or the second thermoelectric generator 162 are electrically coupled to the pump 116 and/or a battery pack assembly 170. As described hereinabove, the pump 116 applies force to the working fluid 118 to facilitate flow of the working fluid 118 through the cooling loop 110. The battery pack assembly 170 includes one or more batteries that provide electrical power to the vehicle 100 and various electronic devices of the vehicle 100. For example, the battery pack assembly 170 may provide electrical power to an electric motor (not depicted) that provides the vehicle 100 with mobility. As the first thermoelectric generator 160 and/or the second thermoelectric generator 162 are electrically coupled to the pump 116 and/or the battery pack assembly 170, the electrical power provided by the temperature differential across the first thermoelectric generator 160 and/or the second thermoelectric generator 162 may be provided to the pump 116 and/or the battery pack assembly 170. By providing electrical power to the pump 116 and/or the battery pack assembly 170, the first thermoelectric generator 160 and/or the second thermoelectric generator 162 provide electrical energy to the vehicle 100 generated from thermal energy that would otherwise be lost to the ambient environment.

Figure 2:
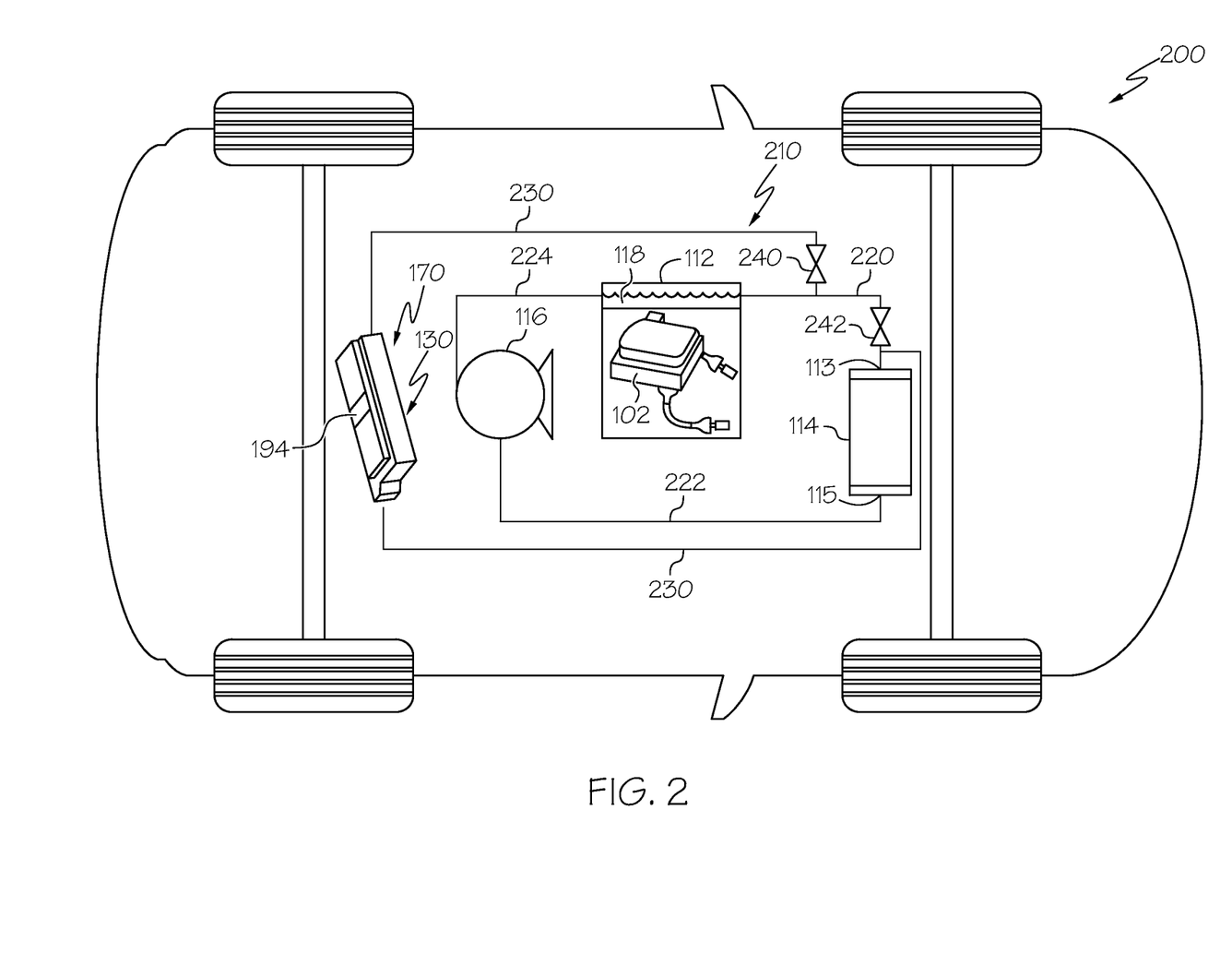
FIG. 2 schematically depicts a cooling system of a vehicle including a battery pack assembly according to one or more embodiments shown or described herein.

Referring to FIG. 2, another embodiment of a cooling loop 210 of the vehicle 200 is depicted. The vehicle 200 includes the power module 102, as described above in reference to FIG. 1. Similarly, the cooling loop 210 includes the cooler 112, the heat exchanger 114, and the pump 116 that are in fluid communication with one another through a two-phase side conduit 220, a liquid side conduit 222, and a pump side conduit 224, as described above in reference to FIG. 1. In this embodiment, the cooling loop 210 includes a battery conduit 230 that is connected to and is in fluid communication with the two-phase side conduit 220, and where the battery conduit 230 is thermally coupled to the battery pack assembly 170.

The cooling loop 210 includes at least one control valve that selectively directs the working fluid 118 through the battery conduit 230. In the embodiment shown in FIG. 2, the cooling loop 210 includes a battery conduit control valve 240 positioned on the battery conduit 230 and a two-phase control valve 242 positioned on the two-phase side conduit 220. To direct the working fluid 118 through the battery conduit 230, the battery conduit control valve 240 opens and the two-phase control valve 242 closes, directing the working fluid 118 from the cooler 112 through the battery conduit 230. Conversely, the battery conduit control valve 240 may close and the two-phase control valve 242 may open to prohibit flow of the working fluid 118 through the battery conduit 230 and to direct the working fluid 118 through the two-phase side conduit 220 to the heat exchanger 114. Alternatively, the battery conduit control valve 240 and the two-phase control valve 242 may both open such that the working fluid 118 from the cooler 112 flows both through the battery conduit 230 and the two-phase side conduit 220 to the heat exchanger 114 simultaneously. It should be understood that the battery conduit control valve 240 alone may selectively direct the working fluid 118 through the battery conduit 230, for example, in embodiments that do not include a two-phase control valve 242 or when the two-phase control valve 242 remains open.

In the embodiment shown in FIG. 2, the battery pack assembly 170 is thermally coupled to the battery conduit 230, which is in fluid communication with the two-phase side conduit 220. The working fluid 118 from the cooler 112 in the two-phase side conduit 220, and accordingly the working fluid 118 in the battery conduit 230 has absorbed thermal energy from the power module 102 and is a vapor or vapor/liquid mixture. As the battery pack assembly 170 is thermally coupled to the battery conduit 230, the thermal energy of the working fluid 118 heats the battery pack assembly 170. As the working fluid 118 flows past the battery pack assembly 170, the battery conduit 230 may direct the working fluid back to the two-phase side conduit 220 and through the heat exchanger 114. Alternatively, the battery conduit 230 may direct the working fluid 118 to the liquid side conduit 222 after the working fluid 118 flows past the battery pack assembly 170.

By directing the working fluid 118 through the battery conduit 230 and heating the battery pack assembly 170, thermal energy from the working fluid 118 may heat the battery pack assembly 170 to maintain the battery pack assembly 170 at an operational temperature using thermal energy that would otherwise be lost to the ambient environment. As such, the need to utilize additional heaters (not depicted) to maintain the battery pack assembly 170 at an operational temperature may be reduced, reducing the overall energy used by the vehicle 200.

Figure 3:
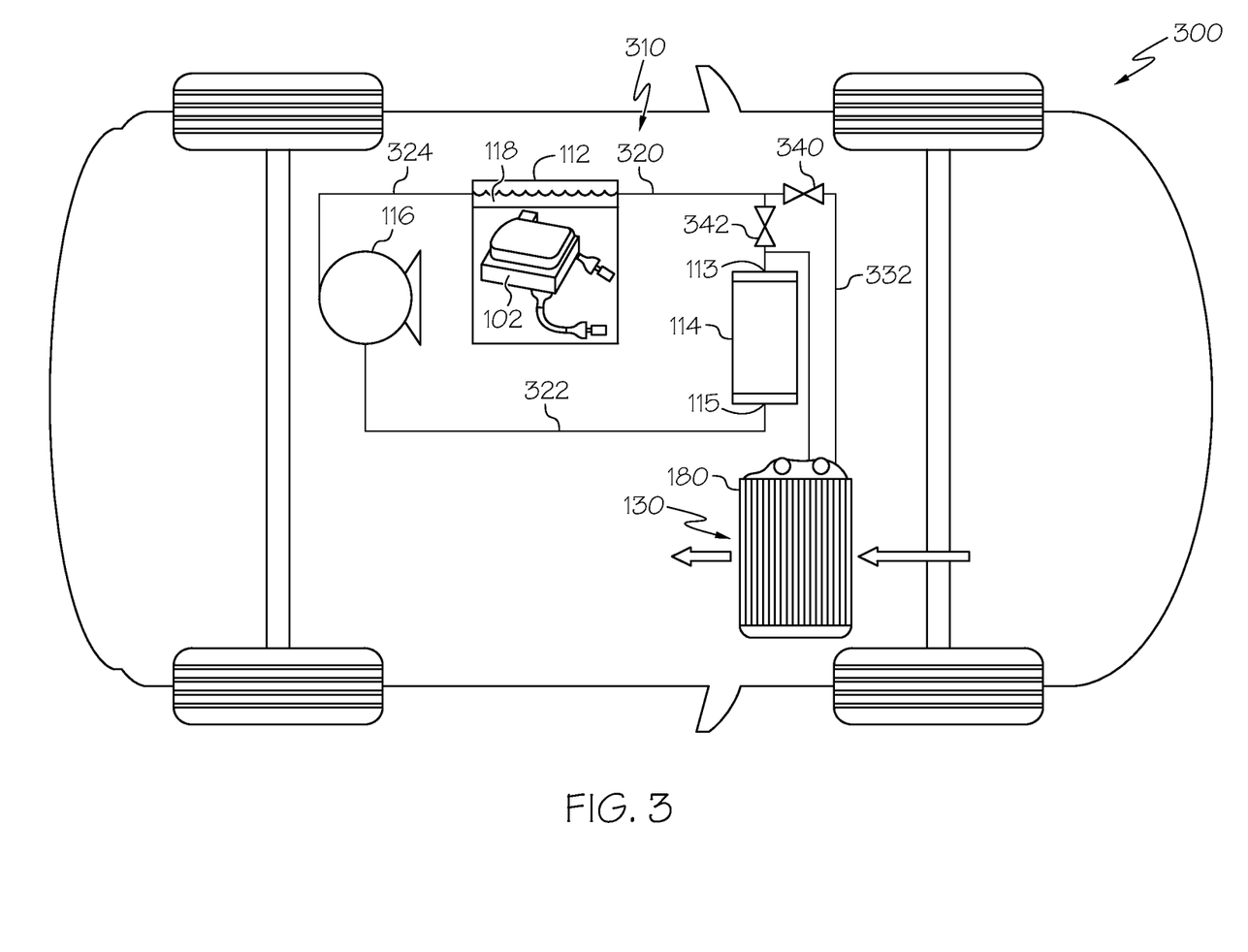
FIG. 3 schematically depicts a cooling system of a vehicle including a heater core according to one or more embodiments shown or described herein.

Referring to FIG. 3, another embodiment of a cooling loop 310 of the vehicle 300 is depicted. The vehicle 300 includes the power module 102, as described above with respect to FIGS. 1 and 2. Similarly, the cooling loop 310 includes the cooler 112, the heat exchanger 114, and the pump 116 that are in fluid communication with one another through a two-phase side conduit 320, a liquid side conduit 322, and a pump side conduit 324 as described above with respect to FIGS. 1 and 2. In this embodiment, the cooling loop 310 includes a heater core conduit 332 that is connected to and is in fluid communication with the two-phase side conduit 320 and that is thermally coupled to a heater core 180. The heater core 180 may facilitate heating of a cabin of the vehicle, as commonly understood in the art.

The cooling loop 310 includes at least one control valve that selectively directs the working fluid 118 through the heater core conduit 332. In the embodiment shown in FIG. 3, the cooling loop 310 includes a heater core control valve 340 positioned on the heater core conduit 332 and a two-phase control valve 342 positioned on the two-phase side conduit 320. To direct the working fluid 118 through the heater core conduit 332, the heater core control valve 340 opens and the two-phase control valve 342 closes, directing the working fluid 118 from the cooler 112 through the heater core conduit 332. Conversely, the heater core control valve 340 may close and the two-phase control valve 342 may open to prohibit flow of the working fluid 118 through the heater core conduit 332 and to direct the working fluid 118 through the two-phase side conduit 320 to the heat exchanger 114. Alternatively, the heater core control valve 340 and the two-phase control valve 342 may both open such that the working fluid 118 from the cooler 112 flows through the heater core conduit 332 and the two-phase side conduit 320 to the heat exchanger 114 simultaneously. It should be understood that the heater core control valve 340 alone may selectively direct the working fluid 118 through the heater core conduit 332, for example, in embodiments that do not include a two-phase control valve 342 or when the two-phase control valve 342 remains open.

In the embodiment shown in FIG. 3, the heater core 180 is thermally coupled to the heater core conduit 332. As described hereinabove, the working fluid 118 from the cooler 112 has absorbed thermal energy from the power module 102 and is a vapor or vapor/liquid mixture. As the heater core 180 is thermally coupled to the heater core conduit 332, the thermal energy of the working fluid 118 heats the heater core 180. As the working fluid 118 flows past the heater core 180, the heater core conduit 332 may direct the working fluid back 114 to the two-phase side conduit 320 and through the heat exchanger 114. Alternatively, the heater core conduit 332 may direct the working fluid 118 to the liquid side conduit 322 after the working fluid 118 flows past the heater core 180.

By directing the working fluid 118 through the heater core conduit 332 and heating the heater core 180, thermal energy from the working fluid 118 may heat the heater core 180 using thermal energy that would otherwise be lost to the ambient environment. As such, the need to utilize additional heaters (not depicted) to heat the heater core 180 may be reduced, reducing the overall energy used by the vehicle 300.

Figure 4:
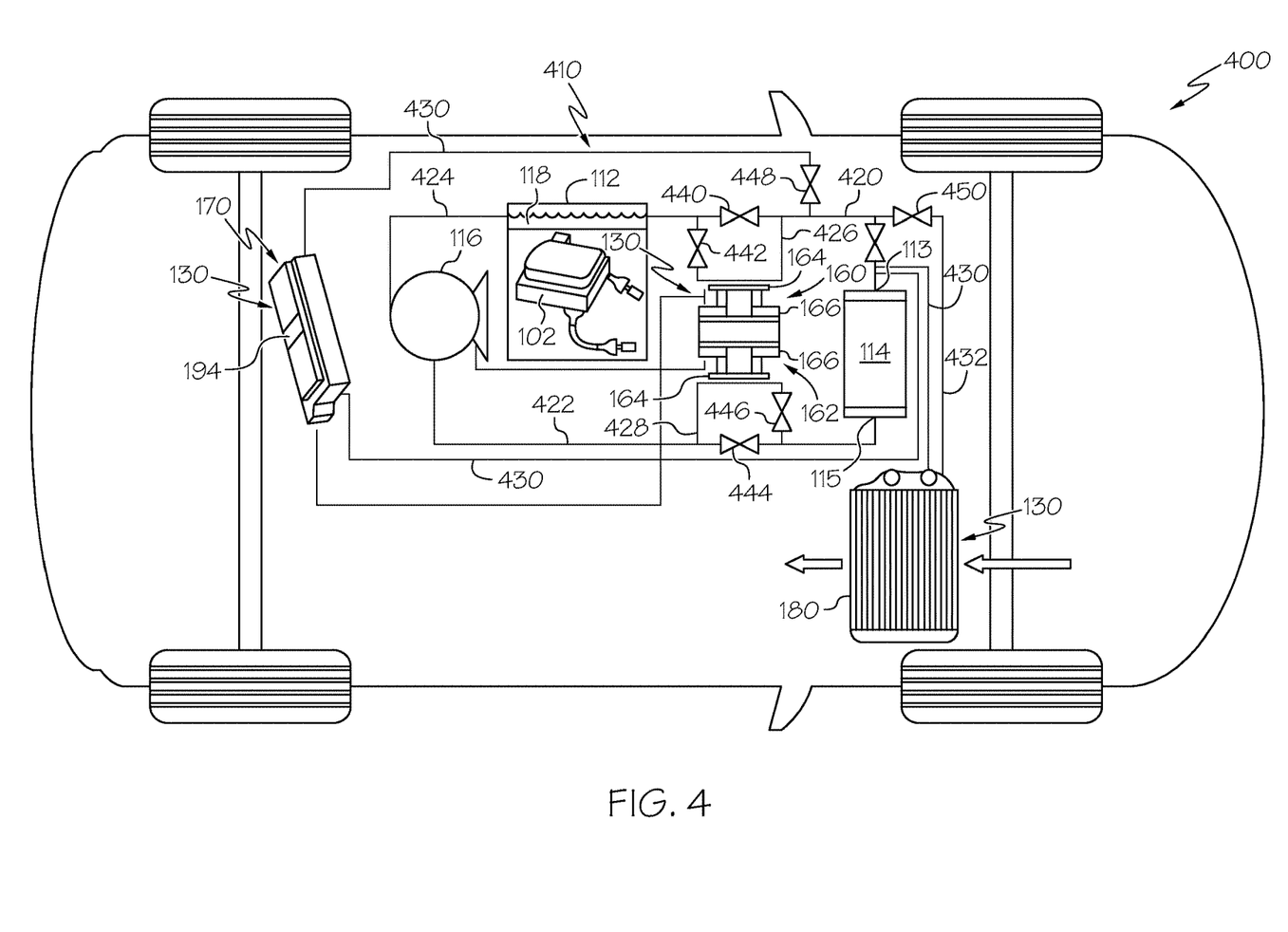
FIG. 4 schematically depicts a cooling system of a vehicle including a thermoelectric generator, a battery pack assembly, and a heater core according to one or more embodiments shown or described herein.

Referring to FIG. 4, another embodiment of a cooling loop 410 of the vehicle 400 is depicted. The vehicle 400 includes the power module 102, as described above with respect to FIGS. 1-3. Similarly, the cooling loop 410 includes the cooler 112, the heat exchanger 114, and the pump 116 that are in fluid communication with one another through a two-phase side conduit 420, a liquid side conduit 422, and a pump side conduit 424, as described above with respect to FIGS. 1-3. In this embodiment, the cooling loop 410 includes at least one thermoelectric generator, a battery conduit 430, and a heater core conduit 432.

The cooling loop 410 includes at least one control valve that selectively directs the working fluid 118 through a two-phase bypass loop 426 and/or a liquid bypass loop 428, as described above with respect to FIG. 1. In embodiments, the cooling loop includes a two-phase control valve 440, a two-phase bypass control valve 442, a liquid control valve 444, and a liquid bypass control valve 446 that selectively direct or prohibit flow of the working fluid 118 through the two-phase bypass loop 426 and the liquid bypass loop 428, as described above with respect to FIG. 1.

In the embodiment shown in FIG. 4, the first thermoelectric generator 160 is thermally coupled to the two-phase bypass loop 426 and the second thermoelectric generator 162 is thermally coupled to the liquid bypass loop 428. As described above with respect to FIG. 1, the two-phase control valve 440, the two-phase bypass control valve 442, the liquid control valve 444, and the liquid bypass control valve 446 selectively direct flow of the working fluid 118 through the two-phase bypass loop 426 and the liquid bypass loop 428, thereby controlling the amount of electrical energy generated by the first thermoelectric generator 160 and/or the second thermoelectric generator 162. The first thermoelectric generator 160 and/or the second thermoelectric generator 162 are electrically coupled to and provide electrical power to the battery pack assembly 170 and the pump 116 generated from the temperature differential across the first thermoelectric generator 160 and/or the second thermoelectric generator 162.

The cooling loop 410 includes the battery conduit 430 that is in fluid communication with the two-phase side conduit 420. At least one control valve selectively directs the working fluid 118 through the battery conduit 430. A battery conduit control valve 448 selectively allows or prohibits flow of the working fluid 118 through the battery conduit 430, as described above with respect to FIG. 2. The battery conduit 430 is thermally coupled to the to the battery pack assembly 170 such that when the working fluid 118 is directed through the battery conduit 430, the working fluid 118 heats the battery pack assembly 170 and may maintain the battery pack assembly 170 at an operational temperature. As the working fluid 118 flows past the battery pack assembly 170, the battery conduit 430 may direct the working fluid 118 back to the two-phase side conduit 420 and through the heat exchanger 114. Alternatively, the battery conduit 430 may direct the working fluid 118 to the liquid side conduit 422 after the working fluid 118 flows past the battery pack assembly 170.

The cooling loop 410 includes the heater core conduit 432 that is in fluid communication with the two-phase side conduit 420. At least one control valve selectively directs the working fluid 118 through the heater core conduit 432. A heater core control valve 450 selectively allows of prohibits flow of the working fluid 118 through the heater core conduit 432, as described above with respect to FIG. 3. The heater core conduit 432 is thermally coupled to the heater core 180 such that when the working fluid 118 is directed through the heater core conduit 432, the working fluid 118 heats the heater core 180 and assists heating the cabin of the vehicle 400. As the working fluid 118 flows past the heater core 180, the heater core conduit 432 may direct the working fluid back to the two-phase side conduit 420 and through the heat exchanger 114. Alternatively, the heater core conduit 432 may direct the working fluid 118 to the liquid side conduit 422 after the working fluid 118 flows past the heater core 180.

Accordingly, the cooling loop 410 may selectively direct the working fluid 118 from the cooler 112 to produce electrical power via the first thermoelectric generator 160 and/or the second thermoelectric generator 162, to heat the battery pack assembly 170, and to heat the heater core 180. In particular, the battery pack assembly 170 and the heater core 180 are connected to the cooling loop 410 "in parallel" such that the working fluid 118 may simultaneously flow past both the battery pack assembly 170 and the heater core 180.

Figure 5:
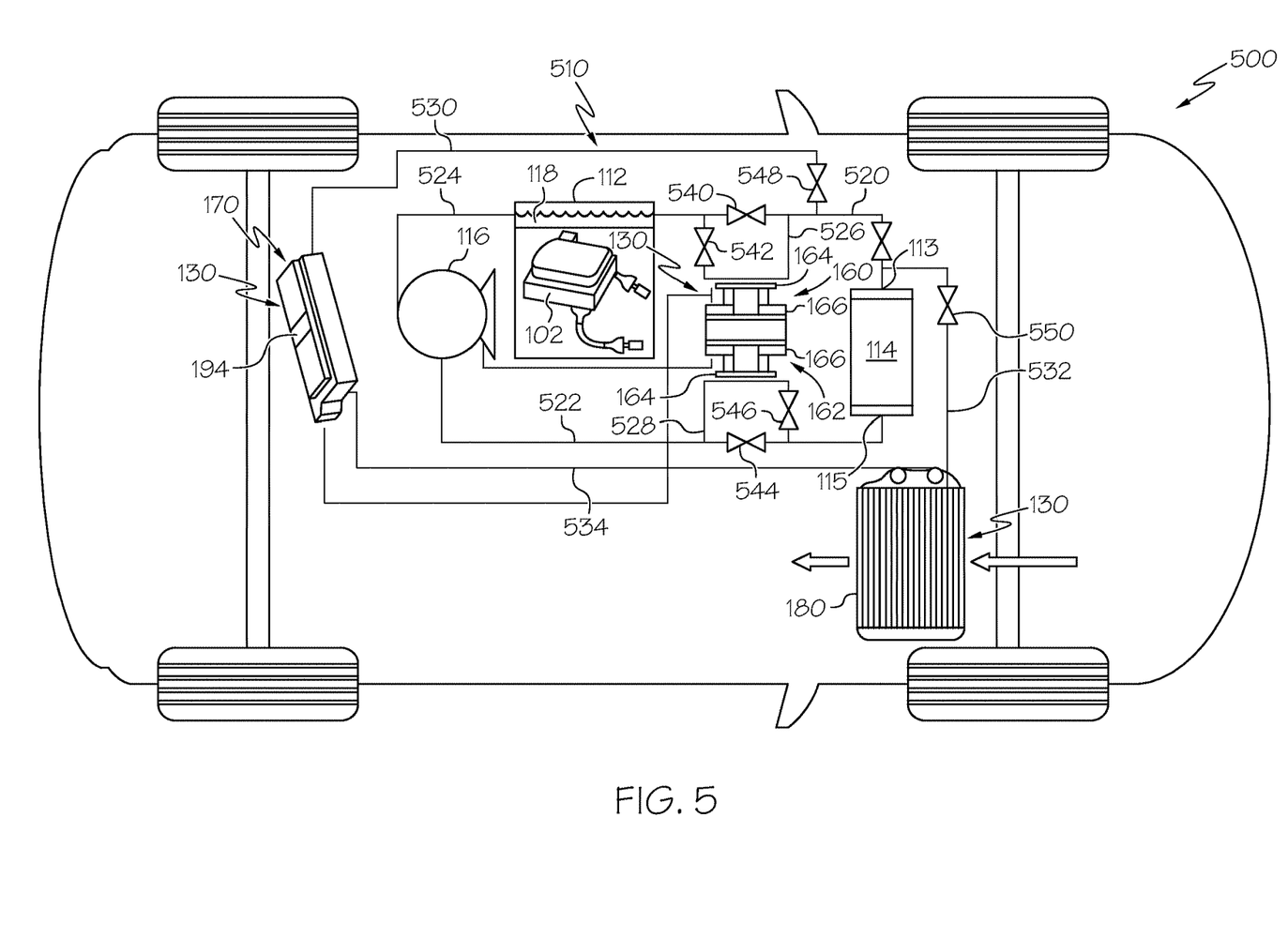
FIG. 5 schematically depicts a cooling system of a vehicle including a thermoelectric generator, a battery pack assembly, and a heater core according to one or more embodiments shown or described herein.

Referring to FIG. 5, another embodiment of a cooling loop 510 of the vehicle 500 is depicted. The vehicle 500 includes the power module 102, as described above with respect to FIGS. 1-4. Similarly, the cooling loop 510 includes the cooler 112, the heat exchanger 114, and the pump 116 that are in fluid communication with one another through a two-phase side conduit 520, a liquid side conduit 522, and a pump side conduit 524, as described above with respect to FIGS. 1-4. In this embodiment, the cooling loop 510 includes an intermediate conduit 534 connected to and positioned between the battery conduit 530 and the heater core conduit 532 such that the battery conduit 530 and the heater core conduit 532 are in fluid communication with one another.

The cooling loop 510 includes at least one control valve that selectively directs the working fluid 118 through a two-phase bypass loop 526 and/or a liquid bypass loop 528, as described above with respect to FIGS. 1 and 4. In embodiments, the cooling loop 510 includes a two-phase control valve 540, a two-phase bypass control valve 542, a liquid control valve 544, and a liquid bypass control valve 546 that selectively direct or prohibit flow of the working fluid 118 through the two-phase bypass loop 526 and the liquid bypass loop 528, as described above with respect to FIGS. 1 and 4.

In the embodiment shown in FIG. 5, the first thermoelectric generator 160 is thermally coupled to the two-phase bypass loop 526 and the second thermoelectric generator 162 is thermally coupled to the liquid bypass loop 528. As described above with respect to FIGS. 1 and 4, the two-phase control valve 540, the two-phase bypass control valve 542, the liquid control valve 544, and the liquid bypass control valve 546 selectively direct flow of the working fluid 118 through the two-phase bypass loop 526 and the liquid bypass loop 528, thereby controlling the amount of electrical energy generated by the first thermoelectric generator 160 and/or the second thermoelectric generator 162. The first thermoelectric generator 160 and/or the second thermoelectric generator 162 are electrically coupled to and provide electrical power to the battery pack assembly 170 and the pump 116 generated from the temperature differential across the first thermoelectric generator 160 and/or the second thermoelectric generator 162.

The cooling loop 510 includes the battery conduit 530 that is in fluid communication with the two-phase side conduit 520. At least one control valve selectively directs the working fluid 118 through the battery conduit 530. A battery conduit control valve 548 selectively allows or prohibits flow of the working fluid 118 through the battery conduit 530, as described above with respect to FIGS. 2 and 4. The battery conduit 530 is thermally coupled to the to the battery pack assembly 170 such that when the working fluid 118 is directed through the battery conduit 530, the working fluid 118 heats the battery pack assembly 170 and may maintain battery pack assembly 170 at an operational temperature.

The cooling loop 510 includes the heater core conduit 532 that is thermally coupled to the heater core 180. As described above with respect to FIGS. 1 and 3, the working fluid 118 in the heater core conduit 532 heats the heater core 180 and assists in heating the cabin of the vehicle 500.

In the embodiment shown in FIG. 5, the intermediate conduit is connected to the battery conduit 530 and the heater core conduit 532 such that the battery conduit 530 and the heater core conduit 532 are in fluid communication with one another. As the battery conduit 530 and the heater core conduit 532 are in fluid communication with one another, the working fluid 118 may flow between the battery conduit 530 and the heater core conduit 532 to heat the battery pack assembly 170 and the heater core 180. For example, the working fluid 118 may first flow through the battery conduit control valve 548 and through the battery conduit 530 to the battery pack assembly 170. The working fluid 118 may flow past the battery pack assembly 170 and thorough the intermediate conduit 534 to the heater core conduit 532 to heat the heater core 180. The working fluid 118 may then flow through the heater core conduit 532 and the heater core control valve 550, returning to the two-phase side conduit 520. In this example, the heater core control valve 550 may be a one-way valve that selectively allows the working fluid 118 to flow from the heater core conduit 532 to the two-phase side conduit 520 but prohibits flow of the working fluid 118 from the two-phase side conduit 520 to the heater core conduit 532.

The battery conduit 530 may be connected to the two-phase side conduit 520 at a position that is upstream of the position at which the heater core conduit 532 is connected to the two-phase side conduit 520. In other words, the battery conduit 530 is connected to the two-phase side conduit 520 at a location that is farther away from the heat exchanger 114 than the location at which the heater core conduit 532 is connected to the two-phase side conduit 520. As the battery conduit 530 is connected to the two-phase side conduit 520 at a position that is upstream of the heater core conduit 532, the working fluid 118 may flow through the battery conduit 530 first, then the intermediate conduit 534 and the heater core conduit 532.

Alternatively, the heater core conduit 532 may be connected to the two-phase side conduit 520 at a position that is upstream of the battery conduit 530 such that the working fluid 118 flows through the heater core conduit 532 prior to the intermediate conduit 534 and the battery conduit 530. For example, the heater core control valve 550 may selectively open and allow the working fluid 118 to and through the heater core conduit 532 to the heater core 180. The working fluid 118 may flow past the heater core 180 and through the intermediate conduit 534 to the battery pack assembly 170. The working fluid 118 may then flow through the battery conduit 530 and the battery conduit control valve 548, returning to the two-phase side conduit 520 and through the heat exchanger 114. In this example, the battery conduit control valve 548 may be a one-way valve that selectively allows the working fluid 118 to flow from the battery conduit 530 to the two-phase side conduit 520 but prohibits flow of the working fluid 118 from the two-phase side conduit 520 to the battery conduit 530.

Accordingly, the cooling loop 510 may selectively direct the working fluid 118 from the cooler 112 to produce electrical power via the first thermoelectric generator 160 and/or the second thermoelectric generator 162, to heat the battery pack assembly 170, and to heat the heater core 180. In particular, in the embodiment of the cooling loop 510 depicted in FIG. 5, an intermediate conduit 534 connects the battery pack assembly 170 and the heater core 180 to the cooling loop 510 "in series" such that the working fluid 118 flows past one of the battery pack assembly 170 or the heater core 180 prior to flowing past the other. By connecting the battery pack assembly 170 and the heater core 180 to the cooling loop 510 in this configuration, the volume of the working fluid 118 required to heat the battery pack assembly 170 and the heater core 180 may be minimized, as compared to when the battery pack assembly 170 and the heater core are connected to the cooling loop in parallel, as shown in FIG. 4.

Figure 6:
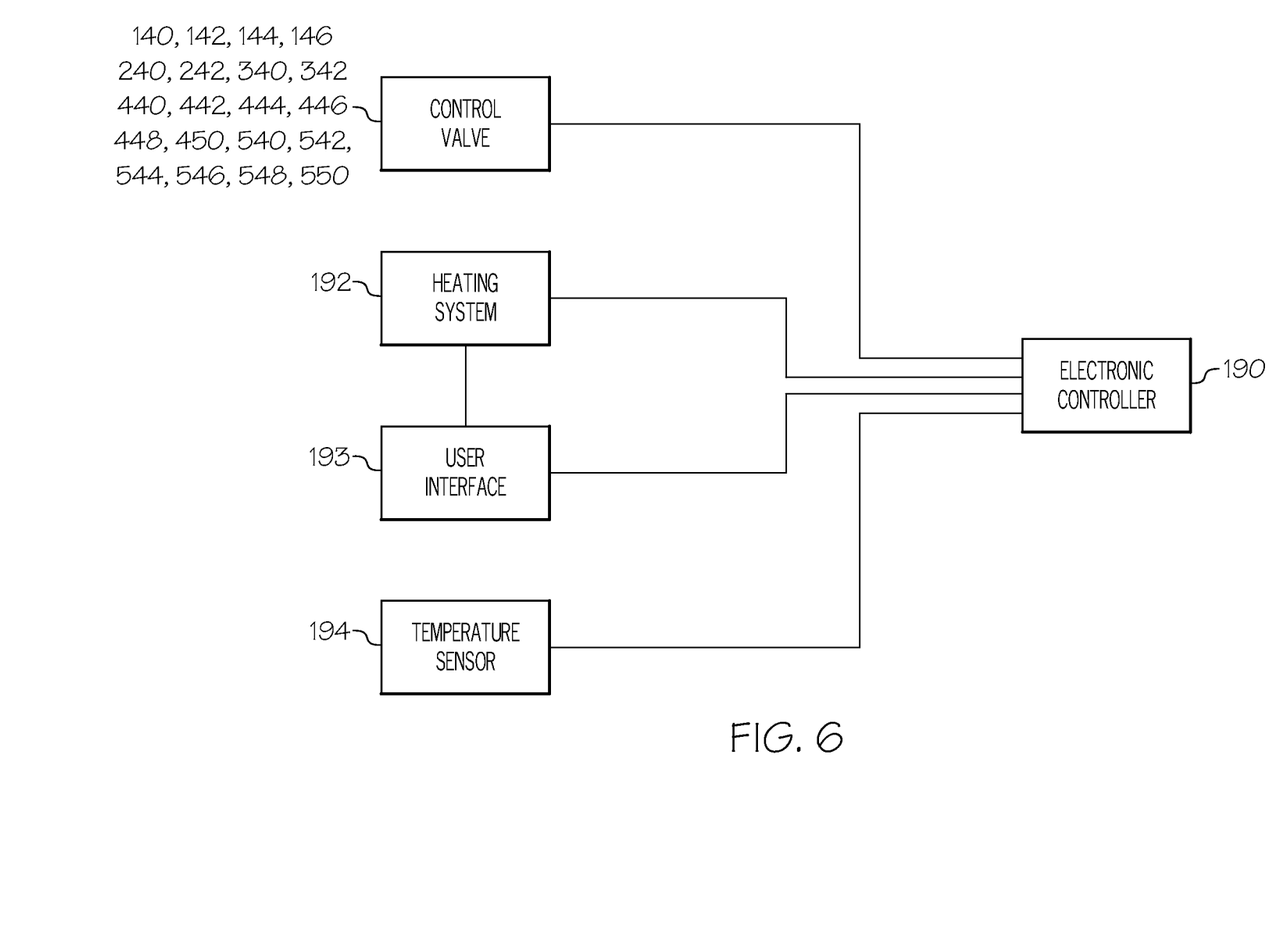
FIG. 6 schematically depicts a block diagram an electronic controller, a temperature sensor, a user interface, a heating system, and at least one control valve according to one or more embodiments shown or described herein.
Figure 7:
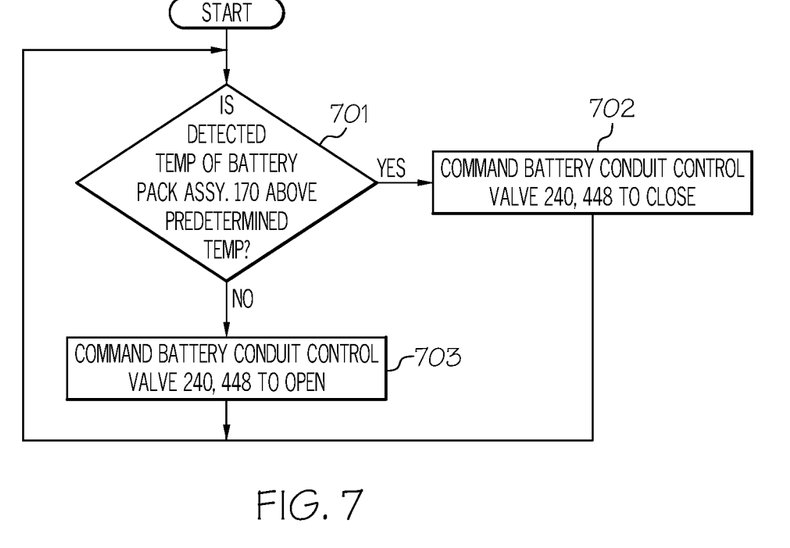
FIG. 7 depicts a flowchart of a method for operating a cooling system according to one or more embodiments shown or described herein.
Figure 8:
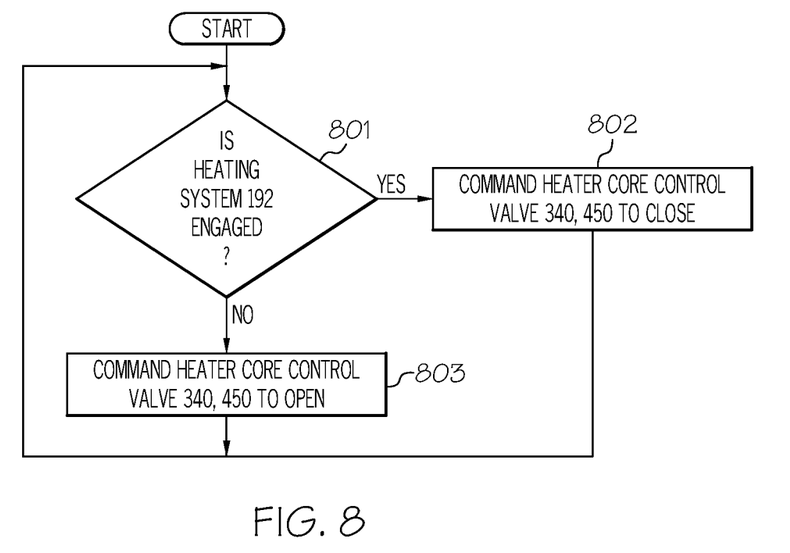
FIG. 8 depicts a flowchart of a method for operating a cooling system according to one or more embodiments shown or described herein.

Referring to FIG. 6, an electronic controller 190 is communicatively coupled to the at least one control valve of the cooling loops 110, 210, 310, 410, and 510 to selectively direct the working fluid 118. The electronic controller 190 includes a processor and a memory storing computer readable and executable instructions, which, when executed by the processor, facilitate operation of the cooling loops 110, 210, 310, 410, and 510.

Referring to FIGS. 1 and 6, the electronic controller 190 is communicatively coupled to the two-phase control valve 140, the two-phase bypass control valve 142, the liquid control valve 144, and the liquid bypass control valve 146. The electronic controller 190 sends signals to command the two-phase control valve 140, the two-phase bypass control valve 142, the liquid control valve 144, and the liquid bypass control valve 146 to open or close as described above to selectively direct or prohibit flow of the working fluid 118 through the two-phase bypass loop 126 and the liquid bypass loop 128.

Referring to FIGS. 2 and 6, the electronic controller 190 is communicatively coupled to the battery conduit control valve 240 and the two-phase control valve 242. The electronic controller 190 sends signals to command the battery conduit control valve 240 and the two-phase control valve 242 to open or close as described above to selectively direct or prohibit flow of the working fluid 118 through the battery conduit 230.

Referring to FIGS. 3 and 6, the electronic controller 190 is communicatively coupled to the heater core control valve 340 and the two-phase control valve 342. The electronic controller 190 sends signals to command the heater core control valve 340 and the two-phase control valve 342 to open or close as described above to selectively direct or prohibit flow of the working fluid 118 through the heater core conduit 332.

Referring to FIGS. 4 and 6, the electronic controller 190 is communicatively coupled to the two-phase control valve 440, the two-phase bypass control valve 442, the liquid control valve 444, the liquid bypass control valve 446, the battery conduit control valve 448, and the heater core control valve 450. The electronic controller 190 sends signals to command the two-phase control valve 440, the two-phase bypass control valve 442, the liquid control valve 444, the liquid bypass control valve 446, the battery conduit control valve 448, and the heater core control valve 450 to open or close as described above to selectively direct or prohibit flow of the working fluid 118 through the two-phase bypass loop 426, the liquid bypass loop 428, the battery conduit 430, and the heater core conduit 432.

Referring back to FIG. 6, the electronic controller 190 is communicatively coupled to a heating system 192 and/or a user interface 193 of the heating system 192. The heating system 192 includes the heater core 180 (FIGS. 3, 4, 5) and provides heat to the cabin of the vehicle 300, 400, 500. The user interface 193 detects a user input, such as an input related to a desired temperature of the cabin of the vehicle 300, 400, 500. For example, an occupant of the vehicle 300, 400, 500 may use the user interface 193 to engage or disengage the heating system 192 of the vehicle 300, 400, 500. In some embodiments, the user interface 193 may include a thermostat in which the occupant may input a desired temperature of the cabin of the vehicle 300, 400, 500. In either instance, the user interface 193 may send a signal to the electronic controller 190 and the electronic controller 190 may command the heating system 192 to engage or disengage based on the signal from the user interface 193. Alternatively, the heating system 192 may include a separate controller (not depicted) that engages and disengages the heating system 192. In this instance, the user interface 193 may send a signal to the heating system 192 to engage or disengage the heating system 192, and the heating system 192 may send a signal to the electronic controller 190 indicative of the engagement or disengagement of the heating system 192.

A temperature sensor 194 is communicatively coupled to the electronic controller 190. The temperature sensor 194 is thermally coupled to the battery pack assembly 170 (FIGS. 1-5), and detects an operating temperature of the battery pack assembly 170. The temperature sensor 194 sends signals indicative of the detected temperature of the battery pack assembly 170 to the electronic controller 190.

Referring to FIGS. 2, 4, 6 and 7, one embodiment of a method for operating the cooling loops 210, 410 is depicted. The battery conduit control valve 240, 448 is selectively opened or closed to direct the working fluid 118 through the battery conduit 230, 430 to heat the battery pack assembly 170 according to the flowchart depicted in FIG. 7. In a first step 701, the electronic controller 190 receives a signal from the temperature sensor 194 that is indicative of a detected temperature of the battery pack assembly 170 and compares the detected temperature to a predetermined temperature. If the detected temperature is greater than the predetermined temperature, then the electronic controller 190 proceeds to step 702. At step 702, the electronic controller 190 commands the battery conduit control valve 240, 448 to close, selectively prohibiting the working fluid 118 from flowing through the battery conduit 230, 430. If the detected temperature is not greater than the predetermined temperature, the electronic controller 190 proceeds to step 703. At step 703, the electronic controller 190 commands the battery conduit control valve 240, 448 to open, selectively directing the working fluid 118 through the battery conduit 230, 430 to heat the battery pack assembly 170.

As described above, by commanding the battery conduit control valve 240, 448 to open, the working fluid 118 from the two-phase side conduit 220, 420 may be directed through the battery conduit 230 to heat the battery pack assembly 170. As described above, the battery pack assembly 170 may need to be maintained within an operational temperature range, and the predetermined temperature may be selected to maintain the battery pack assembly 170 within the range of operational temperatures. In one embodiment, the predetermined temperature is less than 40° C. In another embodiment, the predetermined temperature is less than 35° C. In yet another embodiment, the predetermined temperature is between 25° C. and 40° C. inclusive of the endpoints.

In the embodiment of the cooling loop 410 shown in FIG. 4, when the battery conduit control valve 448 is open, the electronic controller 190 may simultaneously command the two-phase bypass control valve 442 and/or the liquid bypass control valve 446 to close and the two-phase control valve 440 and/or the liquid control valve 444 to open such that the working fluid 118 is prohibited from flowing through the two-phase bypass loop 426 and the liquid bypass loop 428, respectively. By prohibiting flow of the working fluid 118 through the two-phase bypass loop 426 and/or the liquid bypass loop 428, the working fluid 118 may not generate electrical power via the first thermoelectric generator 160 and/or the second thermoelectric generator 162 and may retain more thermal energy to transfer to the battery pack assembly 170.

Conversely, when the battery conduit control valve 448 is closed, the electronic controller 190 may simultaneously command the two-phase bypass control valve 442 and/or the liquid bypass control valve 446 to open and the two-phase control valve 440 and/or the liquid control valve 444 to close such that the working fluid 118 is directed through the two-phase bypass loop 426 and the liquid bypass loop 428, respectively. By directing the working fluid 118 through the two-phase bypass loop 426 and/or the liquid bypass loop 428, the working fluid 118 may be utilized to generate electrical power via the first thermoelectric generator 160 and/or the second thermoelectric generator 162, as described above.

Referring to FIGS. 3, 4, 6 and 8, one embodiment of a method for operating the cooling loops 310, 410 is depicted. The heater core control valve 340, 450 is selectively opened or closed to direct the working fluid 118 through the heater core conduit 332, 432 to heat the heater core 180 according to the flowchart depicted in FIG. 8. In a first step 801, the electronic controller 190 receives a signal from the user interface 193 to disengage the heating system 192 or receives a signal from the heating system 192 that the heating system 192 is disengaged. If the heating system 192 is disengaged, then the electronic controller 190 proceeds to step 802. At step 802, the electronic controller 190 commands the heater core control valve 340, 450 to close, selectively prohibiting the working fluid 118 from flowing through the heater core conduit 332, 432. If the heating system 192 is not disengaged, the electronic controller 190 proceeds to step 803. At step 803, the electronic controller 190 commands the heater core control valve 340, 450 to open, selectively directing the working fluid 118 through the heater core conduit 332, 432 to heat the heater core 180.

Accordingly, the electronic controller 190 commands the heater core control valve 340, 450 to open or close based on the engagement of the heating system 192. As described above, by directing the working fluid 118 through the heater core conduit 332, 432, the working fluid 118 heats the heater core 180 of the heating system 192 and provides heat to the cabin of the vehicle 300, 400.

In the embodiment of the cooling loop 410 shown in FIG. 4, when the heater core control valve 450 is open, the electronic controller 190 may simultaneously command the two-phase bypass control valve 442 and/or the liquid bypass control valve 446 to close and the two-phase control valve 440 and/or the liquid control valve 444 to open such that the working fluid 118 is prohibited from flowing through the two-phase bypass loop 426 and the liquid bypass loop 428, respectively. By prohibiting flow of the working fluid 118 through the two-phase bypass loop 426 and/or the liquid bypass loop 428, the working fluid 118 may not generate electrical power via the first thermoelectric generator 160 and/or the second thermoelectric generator 162 and may retain more thermal energy to transfer to the heater core 180.

Conversely, when the heater core control valve 450 is closed, the electronic controller 190 may simultaneously command the two-phase bypass control valve 442 and/or the liquid bypass control valve 446 to open and the two-phase control valve 440 and/or the liquid control valve 444 to close such that the working fluid 118 is directed through the two-phase bypass loop 426 and the liquid bypass loop 428, respectively. By directing the working fluid 118 through the two-phase bypass loop 426 and/or the liquid bypass loop 428, the working fluid 118 may be utilized to generate electrical power via the first thermoelectric generator 160 and/or the second thermoelectric generator 162, as described above. It should be understood that the method depicted in FIG. 8 may be performed simultaneously with the method depicted in FIG. 7 to operate the cooling loop 410 depicted in FIG. 4.

Figure 9:
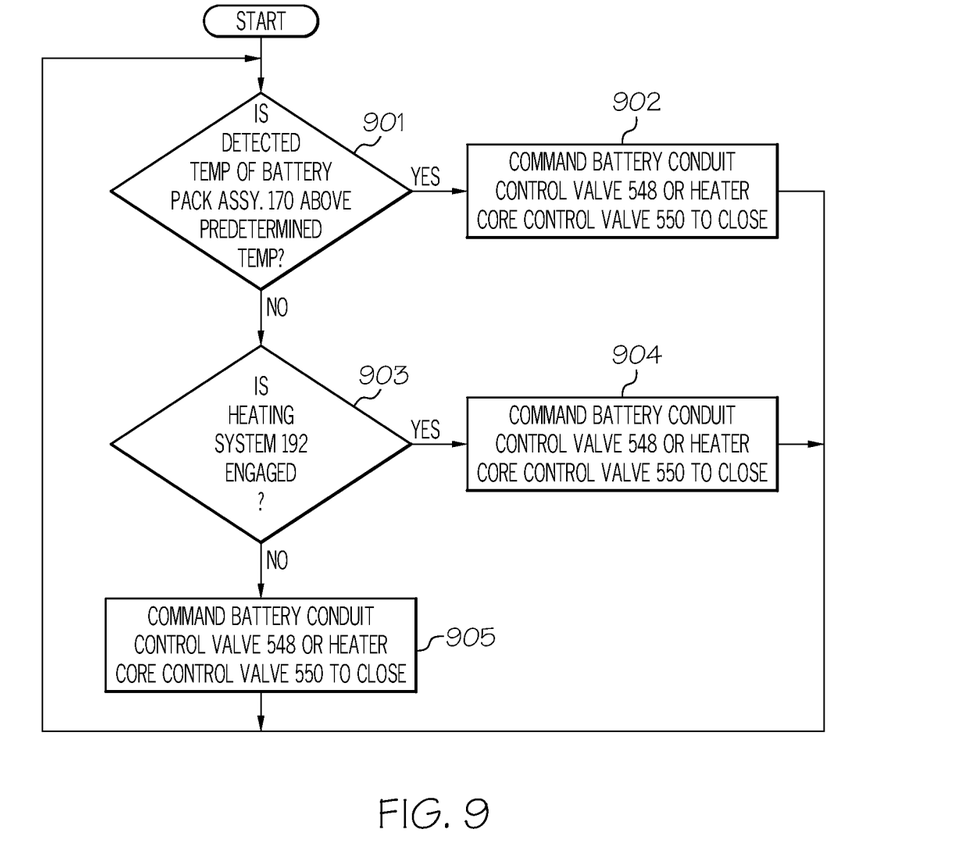
FIG. 9 depicts a flowchart of a method for operating a cooling system according to one or more embodiments shown or described herein.

Referring to FIGS. 5, 6, and 9, one embodiment of a method for operating the cooling loop 510 is depicted. The battery conduit control valve 548 selectively directs or prohibits flow of the working fluid 118 through the battery conduit 530, the intermediate conduit 534, and then through the heater core conduit 532 according to the flowchart depicted in FIG. 9. In a first step 901, the electronic controller 190 receives a signal from the temperature sensor 194 that is indicative of a detected temperature of the battery pack assembly 170 and compares the detected temperature to a predetermined temperature. If the detected temperature is greater than the predetermined temperature, then the electronic controller 190 proceeds to step 902. At step 902, the electronic controller 190 commands the battery conduit control valve 548 to close, selectively prohibiting the working fluid 118 from flowing through the battery conduit 530. If the detected temperature is not greater than the predetermined temperature, the electronic controller 190 proceeds to step 903. At step 903, the electronic controller 190 receives a signal from the user interface 193 to disengage the heating system 192 or receives a signal from the heating system 192 that the heating system 192 is disengaged. If the heating system 192 is disengaged, then the electronic controller 190 proceeds to step 904. At step 904, the electronic controller 190 commands the battery conduit control valve 548 to close, selectively prohibiting the working fluid 118 from flowing through the battery conduit 530. If the heating system 192 is not disengaged, the electronic controller 190 commands the battery conduit control valve 548 to open, selectively directing the working fluid 118 through the battery conduit 530, the intermediate conduit 534 and the heater core conduit 532.

As described above, by commanding the battery conduit control valve 548 to open, the working fluid 118 from the two-phase side conduit 520 may be directed through the battery conduit 530, the intermediate conduit 534, and then the heater core conduit 532. It should be understood that the electronic controller 190 may alternatively command the heater core control valve 550 to selectively open or close at step 902 and step 904. By selectively opening or closing the heater core control valve 550, the cooling loop 510 may direct or prohibit flow of the working fluid 118 through the heater core conduit 532, for example, when the working fluid 118 flows through the heater core conduit 532 prior to the intermediate conduit 534 and the battery conduit 530, as described above. In either instance, i.e., whether the electronic controller 190 commands the battery conduit control valve 548 or the heater core control valve 550 to open or close, the working fluid 118 may selectively be directed to heat the battery pack assembly 170 and the heater core 180 based on the detected temperature of the battery pack assembly 170 and the disengagement of the heating system 192.

In the embodiment of the method for operating the cooling loop 510 depicted in the flow chart of FIG. 9, the step of detecting a temperature of the battery pack assembly 170 and comparing the detected temperature to the predetermined temperature (i.e., step 901) and the step of determining if the heating system 192 is disengaged (i.e., step 903) are depicted and described in a specific order. However, it should be understood that these steps may be performed in any order (i.e., step 903 may be performed before step 903, etc.) or even simultaneously.

As described above, the battery pack assembly 170 may need to be maintained within an operational temperature range, and the predetermined temperature may be selected to maintain the battery pack assembly 170 within the range of operational temperatures. In one embodiment, the predetermined temperature is less than 40° C. In another embodiment, the predetermined temperature is less than 35° C. In yet another embodiment, the predetermined temperature is between 25° C. and 40° C. inclusive of the endpoints.

When the battery conduit control valve 548 is open, the electronic controller 190 may simultaneously command the two-phase bypass control valve 542 and/or the liquid bypass control valve 546 to close and the two-phase control valve 540 and/or the liquid control valve 544 to open such that the working fluid 118 is prohibited from flowing through the two-phase bypass loop 526 and the liquid bypass loop 528, respectively. By prohibiting flow of the working fluid 118 through the two-phase bypass loop 526 and/or the liquid bypass loop 528, the working fluid 118 may not generate electrical power via the first thermoelectric generator 160 and/or the second thermoelectric generator 162 and may retain more thermal energy to transfer to the battery pack assembly 170 and the heater core 180.

Conversely, when the battery conduit control valve 548 is closed, the electronic controller 190 may simultaneously command the two-phase bypass control valve 52 and/or the liquid bypass control valve 546 to open and the two-phase control valve 540 and/or the liquid control valve 544 to close such that the working fluid 118 is directed through the two-phase bypass loop 526 and the liquid bypass loop 528, respectively. By directing the working fluid 118 through the two-phase bypass loop 526 and/or the liquid bypass loop 528, the working fluid 118 may be utilized to generate electrical power via the first thermoelectric generator 160 and/or the second thermoelectric generator 162, as described above.

It should now be understood that vehicles according to the present specification include cooling loops that absorb and dissipate heat generated by a power module of the vehicle. The cooling loops include a cooler that houses a working fluid, a heat exchanger in fluid communication with the cooler, a pump in fluid communication with cooler and the heat exchanger, and a thermoelectric generator thermally coupled to the cooling loop. In some embodiments, the working fluid may be selectively directed to heat a batter pack assembly of the vehicle or a heater core of the vehicle. Through the thermoelectric generator and by selectively directing the working fluid to heat the battery pack assembly and/or the heater core of the vehicle, thermal energy generated by the power module may be harvested and utilized instead of being lost to the environment.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a power module comprising a semiconductor device;
a battery pack assembly for providing electric power to the vehicle;
a heating system for heating a cabin of the vehicle, the heating system comprising a heater core;
a cooling loop thermally coupled to the battery pack assembly and the heater core, the cooling loop comprising:
a cooler having an outer surface thermally coupled to an outer surface of the power module;
a working fluid housed within the cooler, wherein the working fluid absorbs thermal energy from the outer surface of the power module;
a heat exchanger in fluid communication with the cooler;
a pump in fluid communication with the heat exchanger and the cooler;
a two-phase side conduit that connects the cooler and the heat exchanger;
a battery conduit thermally coupled to the battery pack assembly and connected to and in fluid communication with the two-phase side conduit;
a battery conduit control valve positioned on the battery conduit, wherein the battery conduit control valve selectively directs the working fluid through the battery conduit;
a heater core conduit thermally coupled to the heater core and connected to and in fluid communication with the two-phase side conduit; and
a heater core control valve positioned on the heater core conduit, wherein the heater core control valve selectively directs the working fluid through the heater core conduit;
a temperature sensor thermally coupled to the battery pack assembly; and
an electronic controller communicatively coupled to at least one of the battery conduit control valve and the heater core control valve, the temperature sensor, and the heating system, the electronic controller comprising a processor and a memory that stores a computer-readable instruction set, wherein, when the computer-readable instruction set is executed by the processor, the electronic controller:
detects a temperature of the battery pack assembly with the temperature sensor;
detects a disengagement of the heating system; and
commands at least one of the battery conduit control valve and the heater core control valve to direct the working fluid from the cooler to at least one of the battery pack assembly and the heater core based on at least one of the detected temperature of the battery pack assembly and the disengagement of the heating system.

2. The vehicle of claim 1, further comprising at least one thermoelectric generator thermally coupled to the cooling loop.

3. The vehicle of claim 2, wherein the at least one thermoelectric generator comprises a first portion and a second portion, the first portion thermally coupled to the cooling loop and the second portion exposed to a medium that has a lower temperature than the cooling loop.

4. The vehicle of claim 3, wherein the cooling loop further comprises:
   a two-phase side conduit that connects the cooler and the heat exchanger; and
   a two-phase bypass loop that is connected to and in fluid communication with the two-phase side conduit.

5. The vehicle of claim 4, wherein the at least one thermoelectric generator is thermally coupled to the two-phase bypass loop.

6. The vehicle of claim 3, wherein the cooling loop further comprises:
   a liquid side conduit that connects the heat exchanger and the pump; and
   a liquid bypass loop that is connected to and in fluid communication with the liquid side conduit.

7. The vehicle of claim 6, wherein the cooling loop further comprises at least one control valve that selectively directs the working fluid through the liquid bypass loop.

8. The vehicle of claim 6, wherein the at least one thermoelectric generator is thermally coupled to the liquid bypass loop.

9. The vehicle of claim 1, wherein the battery conduit and the heater core conduit are connected to one another by an intermediate conduit.

* * * * *